United States Patent [19]

Iwagaya

[11] Patent Number: 4,864,508
[45] Date of Patent: Sep. 5, 1989

[54] METHOD OF RESTORING COMMANDED POSITION

[75] Inventor: Takashi Iwagaya, Tokyo, Japan
[73] Assignee: Fanuc Ltd., Minamitsuru, Japan
[21] Appl. No.: 145,754
[22] PCT Filed: Apr. 21, 1987
[86] PCT No.: PCT/JP87/00250
 § 371 Date: Dec. 16, 1987
 § 102(e) Date: Dec. 16, 1987
[87] PCT Pub. No.: WO87/06729
 PCT Pub. Date: Nov. 5, 1987

[30] Foreign Application Priority Data

Apr. 21, 1986 [JP] Japan .................. 61-091844

[51] Int. Cl.$^4$ .................. G06F 15/46; G05B 19/18
[52] U.S. Cl. .................. 364/474.19; 318/632; 364/184; 364/474.35
[58] Field of Search .......... 364/474.19, 474.2, 474.34, 364/474.35, 184–187; 318/563, 565, 567, 569, 632; 371/66

[56] References Cited

U.S. PATENT DOCUMENTS

| | | | |
|---|---|---|---|
| 3,691,357 | 9/1972 | McIntosh | 364/474.19 X |
| 4,045,660 | 8/1977 | Weisgerber et al. | 364/474.19 X |
| 4,107,654 | 8/1978 | Nishijima | 318/569 X |
| 4,370,705 | 1/1983 | Imazeki et al. | 364/184 |
| 4,484,287 | 11/1984 | Gamo et al. | 364/474.19 |

Primary Examiner—Joseph Ruggiero
Attorney, Agent, or Firm—Staas & Halsey

[57] ABSTRACT

This invention relates to a commanded position restoration method in a numerical control system comprising an NC unit (11) having a path control function and machine position correction function, a motor (15) rotated on the basis of a command from the NC unit for driving a movable machine element, a pulse coder (16a) which rotates in synchronization with rotation of the motor and which generates a pulse whenever it rotates through a prescribed angle, and a counter (16b) which counts the pulses in dependence upon the direction of rotation for storing the machine position, which counter stores the machine position even if power is cut off.

In the commanded position restoration method, a counted value $C_{RA}$ in the counter (16b) at the time of reference point return is set beforehand in a memory (11c) backed up by a battery. Whenever power is introduced to the system, a counted value $C_A$ in the counter (11c) is read, the reference point is hypothetically taken as the present machine position, and the machine position at introduction of power is taken as a target position.

An interpolation operation is performed internally in a machine-locked state to update present machine position data $C_{RA}$, the movable machine element is moved hypothetically from the reference point to the present machine position which prevailed at introduction of power (i.e. until $C_{RA}=C_A$ holds), and a commanded position which prevailed at introduction of power is restored by using command data necesary for achieving the abovementioned movement.

5 Claims, 3 Drawing Sheets

METHOD OF RESTORING COMMANDED POSITION

TECHNICAL FIELD

This invention relates to a method of restoring a commanded position and, more particularly, to a commanded position restoration method for restoring a commanded position erased by power cut-off.

BACKGROUND ART

A numerical control system is available having a counter for storing a machine position by counting pulses, which are generated by a pulse coder, in dependence upon direction of rotation, which counter continues to store the machine position even if power is cut off. In a numerical control system which includes an absolute pulse coder comprising such a pulse coder and counter, if a reference point return operation is performed just once at the time of machine installation, then automatic operation can start immediately without requiring that the reference point return operation be performed each time power is introduced to the system thereafter. In other words, in an NC system which performs numerical control using only the machine position and not a commanded position (a position conforming to commanded pulses) at the time of NC control, an absolute pulse coder is very effective since it is unnecessary to perform a reference point return operation.

However, in a numerical control system which uses a commanded position in addition to the machine position, it is necessary that the commanded position be restored. Though no difficulties are encountered if the machine position and commanded position are equal, these positions are usually different. The reason for this is that the movable machine element is moved by the commanded pulses and the position thereof is corrected by various types of correction processing, such as for a pitch error correction and straightness correction.

Accordingly, an object of the present invention is to provide a commanded position restoration method in a numerical control system, through which a commanded position which conforms to a machine position at the time power is introduced can be obtained simply and accurately.

DISCLOSURE OF THE INVENTION

The present invention provides a commanded position restoration method in a numerical control system comprising an NC unit having a path control function and machine position correction function, a motor rotated on the basis of a command from the NC unit for driving a movable machine element, a pulse coder which rotates in synchronization with rotation of the motor and which generates a pulse whenever it rotates through a prescribed angle, and a counter which counts the pulses in dependence upon the direction of rotation for storing the machine position, which counter stores the machine position even if power is cut off.

In the commanded position restoration method, a counted value $C_{RA}$ in the counter at the time of reference point return is set beforehand in a memory backed up by a battery. Whenever power is introduced to the system, a counted value $C_A$ in the counter is read, the reference point is hypothetically taken as the present machine position, and the machine position at introduction of power is taken as a target position. An interpolation operation is performed internally in a machine-locked state to update present machine position data $C_{RA}$, the movable machine element is moved hypothetically from the reference point to the present machine position which prevailed at introduction of power (i.e. until $C_{RA}=C_A$ holds), and a commanded position which prevailed at introduction of power is restored by using command data necessary for achieving the abovementioned movement.

BEST MODE FOR CARRYING OUT THE INVENTION

Figure 1:
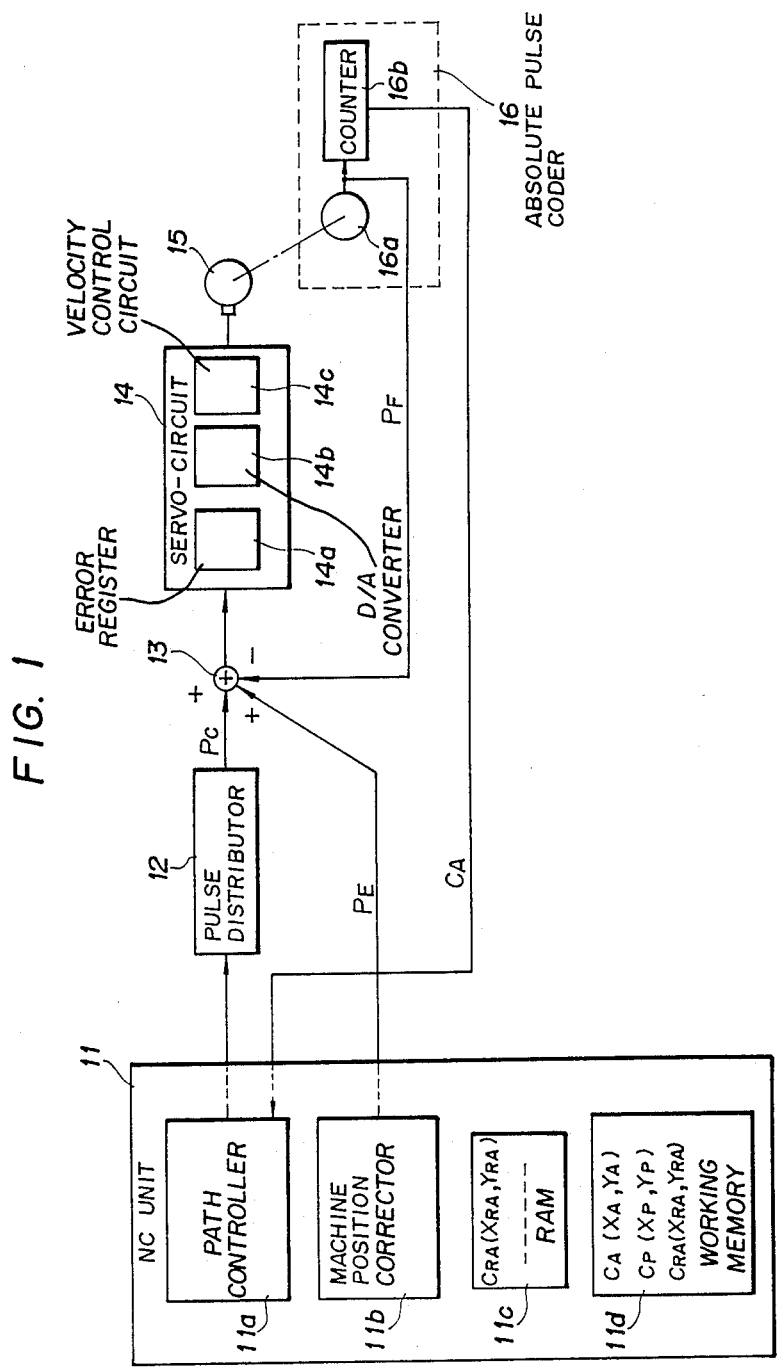
FIG. 1 is a block diagram of a numerical control system embodying the present invention.

FIG. 1 is a block diagram of a numerical control system embodying the present invention, and FIG. 2 is a flowchart of processing according to the invention. In FIG. 1, components other than those constituting an NC unit are illustrated for one axis only; the components for the other axes are arranged in an identical manner.

In FIG. 1, numeral 11 denotes an NC unit, 12 a pulse distributor, 13 a mixing circuit, 14 a servo-circuit, 15 a motor, and 16 an absolute pulse coder.

The NC unit 11 has path control means (a path control program) 11a, machining position correcting means (a correction processing program) 11b, a battery-backed RAM 11c for storing parameters and the like, and a working memory 11d.

The servo-circuit 14 has an error register 14a for storing the difference between feedback pulses $P_F$ generated by a pulse coder and distributed pulses (command pulses) $P_C$, which are outputted by the pulse distributor 12, and correction pulses $P_E$, a DA converter 14b for outputting an analog voltage proportional to the difference, and a velocity control circuit 14c.

The absolute pulse coder 16 comprises a pulse coder 16a which rotates in synchronization with rotation of the motor 15 and which generates the feedback pulse $P_F$ whenever it rotates through a prescribed angle, and a counter 16b which counts the pulses in dependence upon the direction of rotation for storing the machine position, which counter stores the machine position even if power is cut off.

Figure 2A:
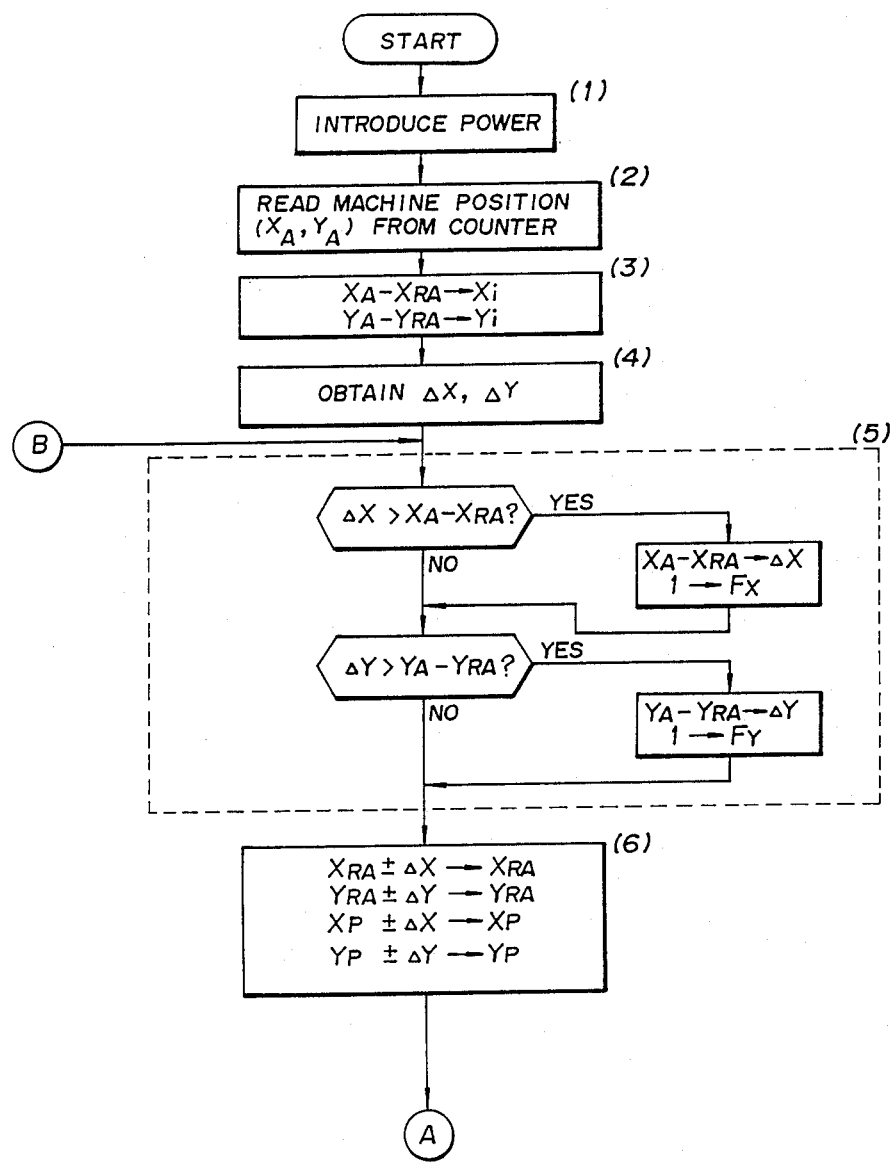
FIGS. 2(A) and 2(B) is a flowchart of processing according to the invention.
Figure 2B:
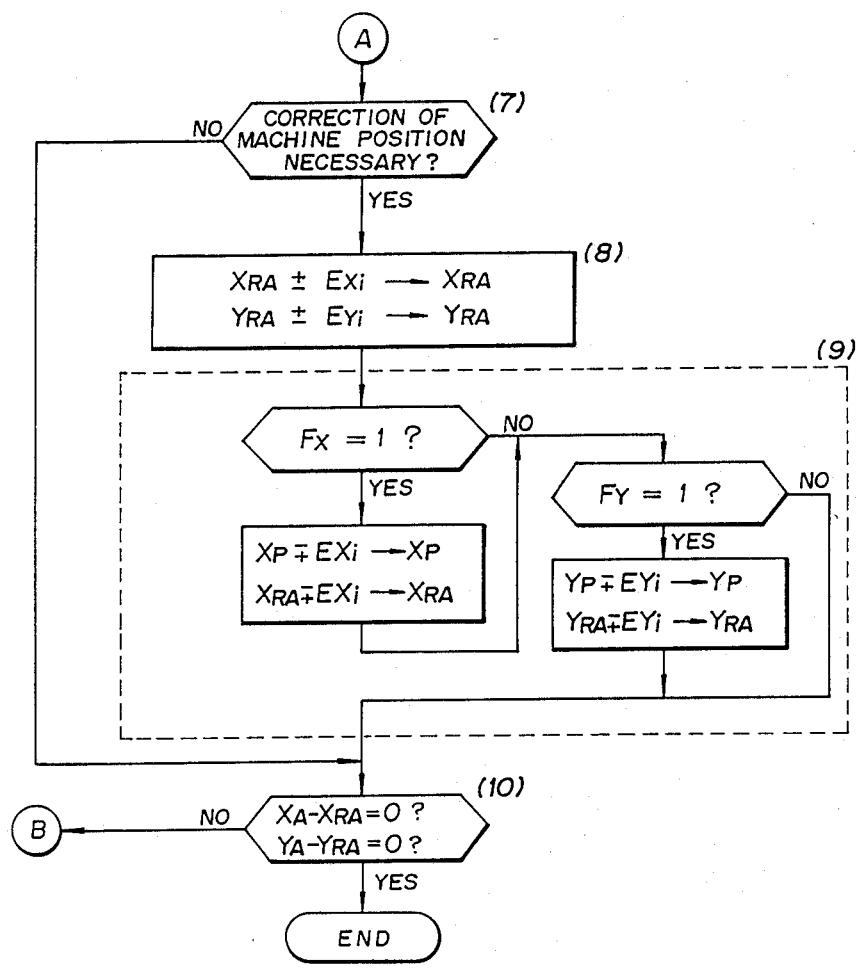

The commanded position restoration method of the invention will now be described in accordance with FIGS. 1, 2(A) and 2(B). It will be assumed that a counted value $C_{RA}$ ($X_{RA}, Y_{RA}$) in the counter 16b at the time of reference point return has been stored in the battery-backed RAM 11c, that power is presently cut off, and that a machine position CA ($X_A, Y_A$) that prevailed prior to the power cut-off has been stored in the counter 16b. Though the components for only one axis are shown in FIG. 1, the invention will be described with regard to two axes, namely the X and Y axes.

(1) The power supply for the NC unit 11 is turned on.

(2) In response to the introduction of power, the path control means 11a reads the machine position ($X_A, Y_A$) stored in the counter 16b of the absolute pulse coder 16 and stores this position in the working memory 11d as a target position. At the same time, the counted value $(X_{RA}, Y_{RA})$ at the reference point is stored in the working memory $11d$ as the present machine position.

Thereafter, the present machine position $(X_{RA}, Y_{RA})$ is updated and the commanded position is updated from zero while interpolation processing is executed in a state where the movable machine element is at rest (i.e. the locked state). In other words, the following is performed:

(3) In accordance with the equations $$X_A - X_{RA} \to X_i, Y_A - Y_{RA} \to Y_i$$

the path control means $11a$ calculates incremental quantities $X_i$, $Y_i$ from the reference point to the machine position which prevailed at the introduction of power.

(4) After the incremental quantities are calculated, amounts of movement $\Delta X$, $\Delta Y$ to be traveled along the respective axes during a time $\Delta T$ preset as a parameter are calculated in accordance with the following equations:

$$\Delta X = X_i \cdot F \cdot \Delta T / \sqrt{X_i^2 + Y_i^2}$$

$$\Delta Y = Y_i \cdot F \cdot \Delta T / \sqrt{X_i^2 + Y_i^2}$$

using the incremental quantities along the respective axes and a commanded velocity F.

(5) Next, a check is performed to determine whether $\Delta X > X_A - X_{RA}$ holds. If the answer is YES, then the operation $X_A - X_{RA} \to \Delta X$ is performed and a flag $F_x$ is set to "1" $(1 \to F_x)$. If the answer is NO, then no action is taken. It should be noted that $X_A - X_{RA}$ is a remaining amount of movement along the X axis.

A check is performed to determine whether $\Delta Y > Y_A - Y_{RA}$ holds. If the answer is YES, then the operation $Y_A - Y_{RA} \to \Delta Y$ is performed and a flag $F_y$ is set to "1" $(1 \to F_y)$. If the answer is NO, then no action is taken and the program proceeds to the next step. It should be noted that $Y_A - Y_{RA}$ is a remaining amount of movement along the Y axis.

(6) Next, the present machine position $(X_{RA}, Y_{RA})$ is updated from the reference point in accordance with the following equations:

$$X_{RA} \pm \Delta X \to X_{RA}, Y_{RA} \pm \Delta Y \to Y_{RA}$$

(the sign depends upon the direction of movement).

The commanded position $(X_P, Y_P)$ is updated in accordance with the following equations:

$$X_P \pm \Delta X \to X_P, Y_P \pm \Delta Y_P \to Y_P$$

It should be noted that the initial values of $X_P$, $Y_P$ are zero, and that the sign depends upon the direction of movement.

(7) Next, the machine position correcting means $11b$ executes machine position correction processing such as pitch error correction processing using the commanded position $(X_P, Y_P)$ or the machine position $(X_{RA}, Y_{RA})$.

Actual pitch error correction processing is performed in the manner described hereinbelow. It should be noted that for each axis (the X axis and Y axis), the range of movement therealong is divided into a plurality of intervals [for example, the range of movement along the X axis is divided into $AX_i (i=1, 2, \ldots)$], and a pitch error correction quantity $EX_i (i=1, 2, \ldots)$ is stored beforehand to correspond to each interval When a commanded position or machine position enters a prescribed interval $AX_i$, the pitch correction quantity $EX_i$ corresponding to this interval is read out. Then, on the basis of the correction quantity $EX_i$ and direction of movement, $EX_i$-number of correction pulses $P_E$ are generated in the prescribed direction to correct the machine position.

Thus, the machine position correcting means $11b$ executes the above-described machine position correction processing using the commanded position or machine position and determines whether a correction is necessary.

(8) If a correction is unnecessary, the program proceeds to the processing of step (10). If a correction is necessary, the machine position is corrected in accordance with the following equations:

$$X_{RA} \pm EX_i \to X_{RA}, Y_{RA} \pm EY_i \to Y_{RA}$$

(9) Next, a check is performed to determine whether the flag $F_x$ is "1". If the flag is not "1", a check is performed to determine whether the flag $F_y$ is "1". If this flag is not "1", then the program proceeds to the next step, namely the tenth step. If $F_x = $ "1", however, then the commanded position $(X_P, Y_P)$ and machine position $(X_{RA}, Y_{RA})$ are updated in accordance with the equations $$X_P \mp EX_i \to X_P, X_{RA} \mp EX_i \to X_{RA}$$

if $F_x = $ "1" holds and in accordance with the equations $$Y_P \mp EY_i \to Y_P, Y_{RA} \mp EY_i \to Y_{RA}$$

if $F_y = $ "1" holds, respectively.

The reason for the processing of the ninth step is as follows: When $EX_i$ or $EY_i$ is corrected in the final stage of interpolation processing, $X_A - X_{RA} = 0$, $Y_A - Y_{RA} = 0$ will not hold in the tenth step unless an equivalent commanded quantity is subtracted from the machine position. Also, subtraction processing similar to that for the machine position must be executed with regard to the commanded position.

(10) After the above processing, it is determined whether $X_A - X_{RA} = 0$, $Y_A - Y_{RA} = 0$ hold. If the answer is YES, processing is ended upon adopting $(X_P, Y_P)$ which prevails at this time as the machine position which prevailed at the introduction of power. If the answer is NO, processing is repeated from step (5) onward.

Thus, in accordance with the present invention, it is arranged to previously store a counted value $C_{RA}$ of a counter belonging to an absolute pulse counter, which counted value prevails at the time of a reference point return operation, update a commanded position $C_P$ from zero and update a machine position from $C_{RA}$ by performing interpolation control in a machine-locked state based on the difference between the counted value $C_{RA}$ and a counted value $C_A$ of the counter prevailing at introduction of power, perform correction processing, in parallel with the interpolation control, for correcting the machine position, correct the machine position $C_{RA}$ based on correction pulses if a correction is necessary, perform the interpolation processing and the correction processing in the machine-locked state until $C_{RA} = C_A$ is established, and adopt $C_P$ which prevails at the time $C_{RA} = C_A$ is established as a commanded position conforming to the machine position prevailing at the introduction of power. Accordingly, a commanded position corresponding to a machine position prevailing at introduction of power can be obtained simple and accurately.

I claim:

1. A method of restoring a commanded position in a numerical control system comprising an NC unit having a path control function and machine position correction function, a motor rotated on the basis of a command from the NC unit for driving a movable machine element, a pulse coder which rotates in synchronization with rotation of said motor and which generates a pulse whenever it rotates through a prescribed angle, and a counter which counts said pulses in dependence upon the direction of rotation for storing the machine position, which counter stores said machine position even if power is cut off, said method characterized by:

storing a counted value $C_{RA}$ of said counter prevailing at the time of a reference point return operation in a non-volatile memory or battery-backed RAM in advance;

updating a commanded position $C_P$ from zero and internally updating a machine position from said counted value $C_{RA}$ after introduction of power by performing interpolation control in a state where the NC unit does not drive the movable machine element;

performing correction processing, in parallel with said interpolation control, for correcting the machine position;

correcting said machine position $C_{RA}$ if a correction is necessary;

performing said interpolation processing and correction processing until $C_{RA}=C_A$ is established, where the counted value of said counter at introduction of power is $C_A$; and adopting $C_P$ which prevails at the time $C_{RA}=C_A$ is established as a commanded position conforming to the machine position prevailing at the introduction of power.

2. A method of restoring a commanded position according to claim 1, characterized by updating the commanded position in accordance with $$C_P + \Delta C \rightarrow C_P$$

at predetermined times, where a commanded amount of movement at each of the predetermined times is $\Delta C$.

3. A method of restoring a commanded position according to claim 2, characterized by correcting the machine position in accordance with $$C_{RA} + \Delta E \rightarrow C_{RA}$$

where a correction quantity is $\Delta E$.

4. A method of restoring a commanded position according to claim 3, characterized by executing said interpolation control based on a difference between said counted value $C_{RA}$ and the counted value $C_A$ of said counter prevailing at introduction of power.

5. A method of restoring a commanded position according to claim 4, characterized in that said motor, pulse coder and counter are provided for each controlled axis of the movable machine element, and a commanded position is determined along each controlled axis by performing interpolation control simultaneously for each of the controlled axes.

* * * * *